United States Patent
Deidewig et al.

(10) Patent No.: US 6,205,880 B1
(45) Date of Patent: Mar. 27, 2001

(54) GEARSHIFT DEVICE FOR CHANGE-SPEED GEARBOXES OF MOTOR VEHICLES

(75) Inventors: Hartmut Deidewig, Roesrath; Jean-Pierre Chazotte, Cologne; Matthias Doelling, Bergisch Gladbach, all of (DE)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/303,750

(22) Filed: May 3, 1999

(30) Foreign Application Priority Data

Feb. 17, 1998 (EP) .................................................. 98102667

(51) Int. Cl.[7] ............................. B60K 20/00; F16H 59/02
(52) U.S. Cl. ................... 74/473.34; 74/473.1; 74/473.33
(58) Field of Search ............................... 74/473.1, 473.3, 74/473.33, 473.34

(56) References Cited

U.S. PATENT DOCUMENTS 2,481,465 * 9/1949 Auten ................................. 74/473.33
3,613,474 * 10/1971 Baumgartl ..................... 74/473.32 X
5,791,194 * 8/1998 Alber et al. ......................... 74/473.1

FOREIGN PATENT DOCUMENTS 195 23 141
C2      6/1995  (DE) .

* cited by examiner

Primary Examiner—Allan D. Herrmann
(74) Attorney, Agent, or Firm—Frank G. McKenzie

(57) ABSTRACT

In a gearshift device for change-speed gearboxes of motor vehicles, having a shifter shaft (1) movable both axially and radially in the gearbox housing and engaging at one end with an actuating lever arrangement (3) with which in turn corresponding ends of a gearshift linkage or of Bowden gearshift cables engage, substantially parallel to the shifter shaft (1) a supporting pin (6) projecting from the gearbox housing or from a closing plate (2) and having a ball-and-socket joint (7) with only two degrees of twisting freedom is provided, on which is supported a three-armed actuating lever (8), the three arms (9, 10 and 11) of which are disposed perpendicular to each other in the manner of orthogonal axes of coordinates, one of said arms (9) being connected by way of a ball-and-socket joint (12) to a pin (4) projecting radially from the shifter shaft (1) and the two other said arms (10 and 11) being connected by way of their ball-and-socket joints (13 and 14) to the corresponding ends of a gearshift linkage or of Bowden gearshift cables (not shown).

4 Claims, 2 Drawing Sheets

GEARSHIFT DEVICE FOR CHANGE-SPEED GEARBOXES OF MOTOR VEHICLES

TECHNICAL FIELD

The invention relates to a gearshift device for change-speed gearboxes of motor vehicles, having a shaft movable both axially and radially in the gearbox housing.

BACKGROUND AND PRIOR ART

German specification DE 195 23 141 C2 discloses a gearshift device for a change-speed gearbox of a motor vehicle in which the actuating lever arrangement for the axially and radially movable shifter shaft is formed from two lever arrangements of which one, for the radial movement, engages directly with the shifter shaft and the other, for the axial movement, engages with the shifter shaft in the manner of a shifter fork, by way of a bell-crank lever mounted in a pivot on a part of the housing.

This known actuating lever arrangement has the disadvantage that the hinge joint is connected in the manner of a shifter fork, with sliding movements, and hence the arrangement concerned has to be lubricated and protected against the entry of dirt by protective bellows.

OBJECT OF THE INVENTION

An object of the invention is to improve a gearshift device for change-speed gearboxes of motor vehicles of the above-mentioned kind so that the actuating lever arrangement can be manufactured more simply and economically and with less outlay for necessary protection from dirt.

THE INVENTION

This object is achieved in accordance with the invention by a gearshift device for change-speed gearboxes of motor vehicles of the said kind in which, substantially parallel to the shifter shaft, a supporting pin projecting from the gearbox housing or from a closing plate and having a ball-and-socket joint with only two degrees of twisting freedom is provided and a three-armed actuating lever is supported on said supporting pin through said restricted ball-and-socket joint, the three arms of the three-armed actuating lever being disposed perpendicular to each other in the manner of orthogonal axes of coordinates, one of said arms being connected by way of a ball-and-socket joint to a pin projecting radially from the shifter shaft and the two other said arms being connected by way of ball-and-socket joints to the correspondingly shaped ends of a gearshift linkage or of Bowden gearshift cables. With this arrangement the desired radial and axial movement of the shifter shaft is transferred only through the one arm of the three-armed actuating lever via the ball-and-socket joint both in the axial and in the radial direction. Such a ball-and-socket joint can, in known manner, be manufactured very economically and can be very simply protected from the entry of dirt.

Further features and advantages of the invention will be apparent from the following description. In particular:

the pin projecting radially from the shifter shaft may be provided directly with a ball head and the co-operating arm of the three-armed actuating lever may be provided directly with a ball socket;

to provide the joint with only two degrees of twisting freedom, the three-armed actuating lever may be provided with a receiving opening in which a pre-stressing spring and upper and lower ball sockets are fixedly received through snap catches; the supporting pin may be formed with a step on which, by means of a bore, a ball is received and locked; and the only two degrees of twisting freedom are established by co-operation of a slot in the lower ball socket part with a step and its alignment in the plane of the shifter shaft by means of the snap catches;

the three-armed actuating lever and the associated parts of the ball-and-socket joints may be made from an industrial plastics material having appropriate strength properties by injection moulding.

BRIEF DESCRIPTION OF THE DRAWINGS

The invention will now be described in more detail, by way of example, with reference to an embodiment shown in the accompanying drawings, in which.

DETAILED DESCRIPTION OF PREFERRED EMBODIMENTS

Figure 1:
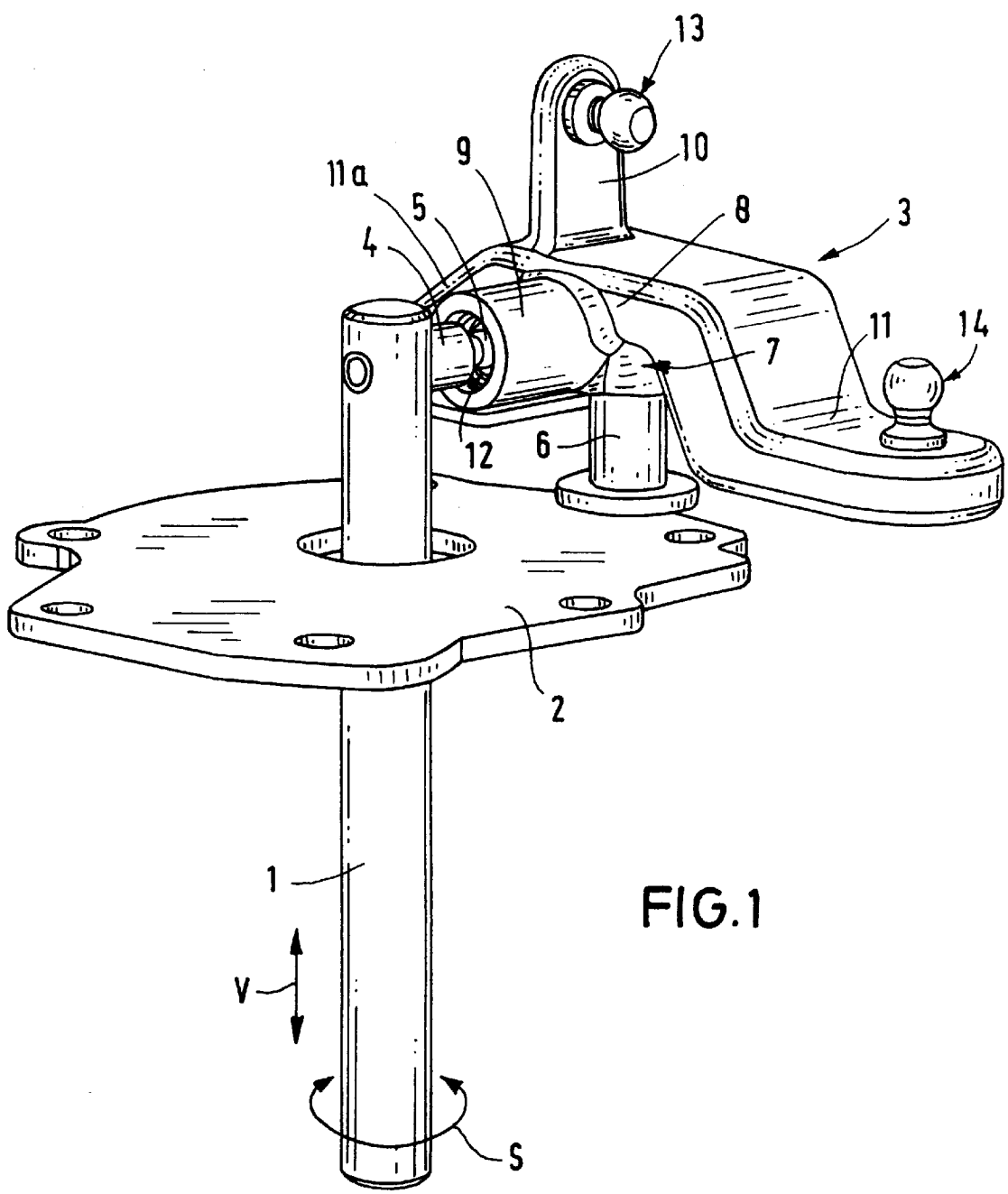
FIG. 1 is a perspective view of the gearshift device for change-speed gearboxes of motor vehicles in accordance with the invention with the three-armed actuating lever.

In FIG. 1 only those parts of a gearshift device for change-speed gearboxes of motor vehicles are shown which are necessary for explanation of the invention: These are the axially and radially movable shifter shaft 1 and a closing plate 2 for closing a mounting opening, to which the parts of the outer actuating lever arrangement 3 are fixed.

According to the present invention the shifter shaft 1 is provided at one of its ends with a radially projecting pin 4 with a ball head 5. In the present case the shifter shaft 1 is axially slidable to perform preselection movements—see the double arrow V—while it is radially movable for the engagement of gears—see the double arrow S.

The closing plate 2, which normally closes an assembly opening in the gearbox housing (not shown), carries a supporting pin 6, which projects substantially parallel to the shifter shaft 1 and is provided with a ball-and-socket joint 7 with only two degrees of twisting movement. A three-armed actuating lever 8 is provided with three mutually perpendicular arms 9, 10 and 11, which are arranged in the manner of axes of orthogonal coordinates and are provided with respective ball and socket joints 12, 13 and 14.

The ball and socket joints 12, 13 and 14 may be of any of a wide variety of known forms.

Through the ball-and-socket joint 7 with only two degrees of twisting freedom the three-armed actuating lever 8 is supported on the supporting pin 6 so that it can only pivot to a limited extent. By way of the ball and socket joint 12, the arm 9 forms a driving connection to the pin 4 on the shifter shaft 1, and conventional gearshift actuating linkages or Bowden gearshift cables (not shown) can engage with the other two arms 10 and 11 of the three-armed actuating lever 8 by way of the ball-and-socket joints 13 and 14.

Figure 2:
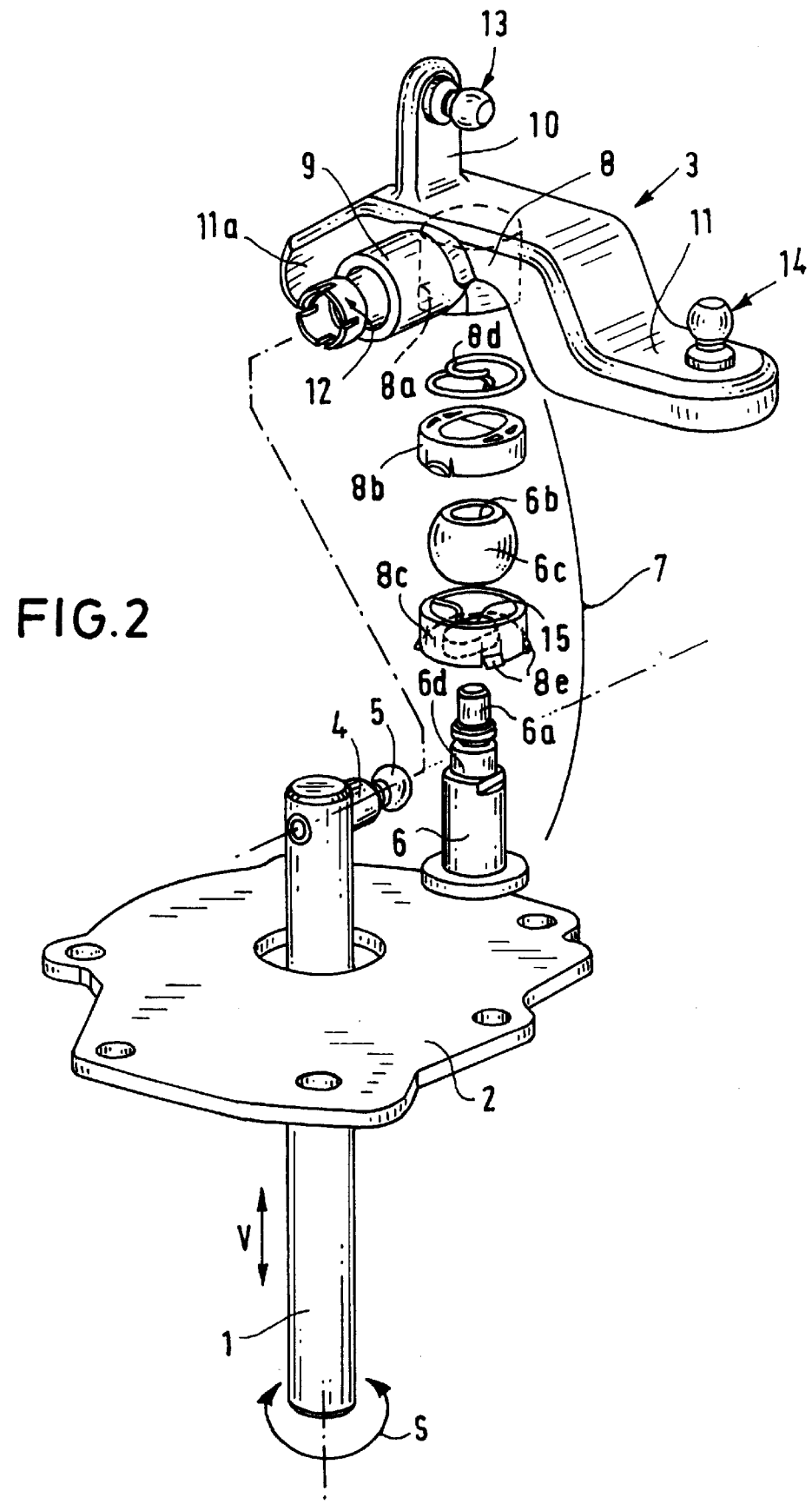
FIG. 2 is an exploded view of the gearshift device shown in claim 1, from which the mutually co-operating individual parts can be seen.

Important features of the invention will now be referred to in detail with reference to FIG. 2, which shows the gearshift device in accordance with the invention in exploded form.

Thus in this embodiment the parts of the ball-and-socket joints 12, 13 and 14 on the three-armed actuating lever 8 are in the one case, namely at 12, in the form of a ball socket and in the other two cases, namely 13 and 14, in the form of a ball head.

The ball socket 12 co-operates with the ball head 5 on the radial pin 4 on the shifter shaft 1, and ball sockets forming end connections of Bowden gearshift cables (not shown) cooperate with the corresponding ball heads 13 and 14.

The ball-and-socket joint 7 having only two degrees of twisting freedom for the supporting pin 6 is of rather more complicated design, and consists of several individual parts, as explained below.

The supporting pin 6 has a relieved or stepped section 6*a* which serves to receive a ball 6*c* provided with a bore 6*b*.

In a cylindrical receiving opening 8*a* in the three-armed actuating lever (indicated in broken lines) an upper and a lower part 8*b* and 8*c* of a ball socket, and also a prestressing spring 8*d*, are received, the lower ball socket 8*c* being held in the receiving opening 8*a* in its final installed position, which determines the position of a slot 15, by corresponding snap projections 8*e*. The slot 15, in combination with the step 6*d* on the pin 6, effects the restriction in accordance with the invention of the degrees of movement of the ball-and-socket joint 7.

The three-armed actuating lever 8 can advantageously be provided with a fourth arm 11*a* which extends the arm 11 in the opposite direction, the arms 11 and 11*a* being provided with additional weights (not shown) which provide a rotating mass which assists the gearshifting movement.

It should be emphasised that the ball-and-socket joints can be designed in a very wide variety of forms known to those skilled in the art, and accordingly their design cannot have any limiting effect on the scope of the invention as set forth in the main claim.

What is claimed is:

1. A gearshift device for change-speed gearboxes of motor vehicles, comprising:

a shifter shaft (1) movable both axially and radially in a gearbox housing, having a first pin (4) projecting radially from the shifter shaft (1);

a supporting pin (6) substantially parallel to the shifter shaft (1), having a first ball-and-socket joint (7) providing two rotary degrees of freedom;

an actuating lever (8) supported on said supporting pin (6) through the ball-and-socket joint (7), the lever having first, second and third arms (9, 10 and 11) disposed on mutually perpendicular axes, the first arm (9) being connected by way of a second ball-and-socket joint (12) to the first pin (4).

2. The device of claim 1 wherein the second arm and third arm each carry a ball head.

3. The device of claim 1, wherein the first pin (4) includes a ball head (5), and the first arm includes a ball socket adapted to receive said ball head.

4. The device of claim 1 or claim 2, wherein:

the actuating lever (8) includes a receiving opening (8*a*) in which a prestressing spring (8*d*) and upper and lower ball sockets (8*b* and 8*c*) are fixedly received through snap catches (8*e*);

the supporting pin (6) includes a step (6*a*) on which a ball (6*c*) is received and to which the supporting pin is locked by means of a bore (6*b*) extending through the ball; and the lower ball socket (8*c*) including a slot (15) co-operating with a step (6*d*) on the supporting pin.

* * * * *